Dec. 21, 1965 W. AUTRUM 3,224,422
ROTARY MECHANISM HOUSING CONSTRUCTION
Filed Oct. 10, 1962
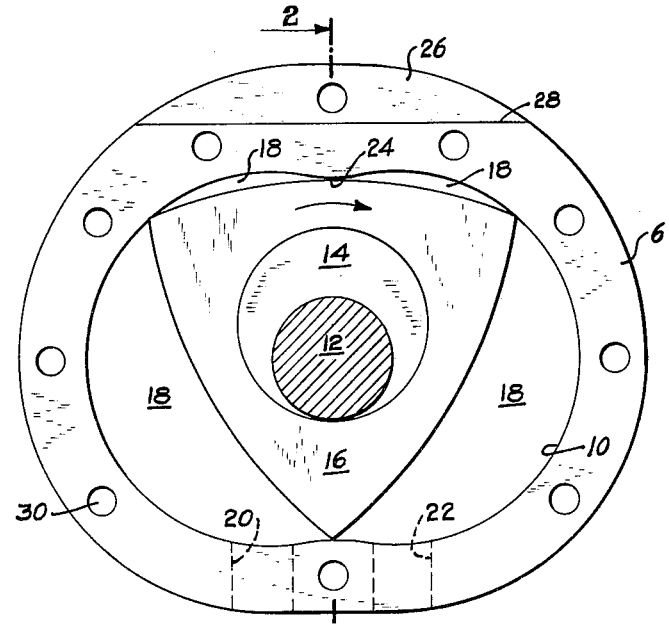
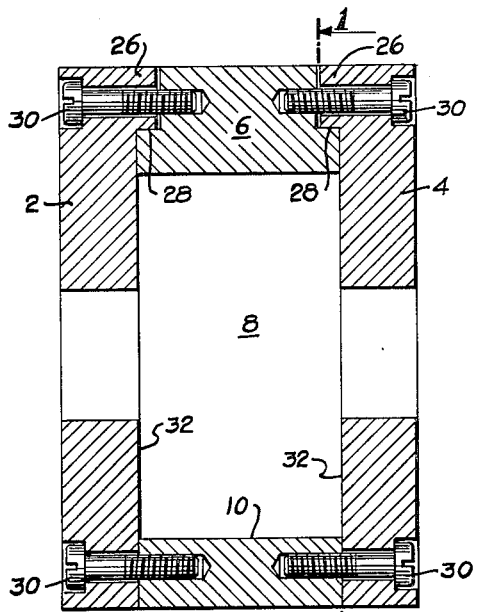
INVENTOR.
WERNER AUTRUM
BY
Thomas W. Kennedy
ATTORNEY United States Patent Office
3,224,422
Patented Dec. 21, 1965

3,224,422
ROTARY MECHANISM HOUSING
CONSTRUCTION
Werner Autrum, Neckarsulm, Wurttemberg, Germany, assignor to NSU Motorenwerke Aktiengesellschaft, Neckarsulm, Germany, and Wankel G.m.b.H., Lindau (Bodensee), Germany
Filed Oct. 10, 1962, Ser. No. 229,663
Claims priority, application Germany, Nov. 18, 1961, N 20,840
3 Claims. (Cl. 123—8)

The present invention relates broadly to the art of rotary mechanisms and is particularly directed to the outer-body wall construction of such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine, but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multi-lobed profile which preferably is basically an epitrochoid. The inner body or rotor has end faces disposed adjacent to said outer body end walls for sealing cooperation therewith, and has a peripheral surface with a plurality of circumferentially-spaced apex portions, each carrying a radially movable seal or seal means for sealing engagement with the multi-lobed inner surface of the outer body peripheral wall to form a plurality of working chambers between the two bodies which vary in volume upon relative rotation of the two bodies. The outer body has intake port means for supply of an intake charge to the working chambers and has exhaust port means for discharge of exhaust gases from the engine. If needed, a suitable spark plug may be provided to ignite the intake charge.

Each chamber performs a four-cycle process in each rotation of the rotor. Ignition occurs near that part of the outer-body peripheral wall adjacent to the epitrochoidal minor axis which the rotor passes rotating between the intake port and exhaust port. The gas forces produced upon ignition and during the expansion cycle tend to deform the peripheral wall.

In prior combustion engines of this type the peripheral and end walls of the outer body have flat engaging surfaces which are clamped and secured together by a plurality of bolts or screws and dowels which are provided particularly in the region of the greatest gas forces, that is in the region in which ignition and expansion takes place.

An object of the present invention comprises the provision of a rotary combustion engine in which a novel outer-body wall construction is provided to minimize deformation of the peripheral wall from the internal gas forces upon ignition and during the engine expansion cycle.

Specifically, in accordance with the invention instead of the peripheral and end walls of the outer body simply having flat engaging surfaces which are clamped together, each end wall is provided with a step or flange which projects axially toward the other end wall to overlie an adjacent outer portion of the peripheral wall. With this construction the overlying step or flange on each end wall interlocks the peripheral and end walls together to help support the peripheral wall against deflection in a radially outward direction thereby supporting the peripheral wall against radially outward internal pressures. Hence, fewer bolts or screws and dowels are required to clamp and secure the outer body walls together.

Further, in accordance with the invention the flange or step on each end wall has a straight or flat radially inner surface and is disposed in the region of greatest internal gas force, with said flange or step being oriented so that it is substantially perpendicular to the gas forces directed outwardly against the peripheral wall in said region. This straight construction of the flange on an end wall facilitates machining of the adjacent flat inner surface of the end wall.

Other objects of the invention will become apparent upon reading the annexed detail description in connection with the drawings in which:

FIGURE 1 is a schematic end view of a rotary combustion engine with the end wall removed, as taken on line 1—1 of FIGURE 2;

FIGURE 2 is a schematic cross-sectional view of a rotary combustion engine, with the inner body and shaft removed, as taken on line 2—2 of FIGURE 1.

Referring to the drawings, the housing or outer body of a rotary combustion engine comprises spaced end walls 2 and 4, and a peripheral wall 6 disposed between and interconnecting said end walls to form a cavity 8 therebetween. The inner surface 10 of the peripheral wall 6 has a multi-lobed profile in cross-section, which preferably is basically an epitrochoid, and further preferably has a two-lobe profile, as illustrated. A shaft 12 having an axis which is co-axial with the axis of the outer-body and along which the end walls 2 and 4 are spaced, extends through the outer body and is journaled in bearings (not shown) carried by the end walls 2 and 4. The shaft 12 has an eccentric portion 14 on which an inner body or rotor 16 is journaled.

The inner body 16 has a plurality of apex portions having sealing cooperation with the peripheral wall inner surface 10 to form a plurality of working chambers 18, which vary in volume upon rotation of the inner body 16 relative to the stationary outer body. In order to maintain the relative motion of the inner-body relative to the stationary outer body, each said body has a meshing gear (not shown) attached thereto.

The outer body has intake port means 20 for supply of an intake charge to the working chambers 18 and has exhaust port means 22 for discharge of exhaust gases from the engine, said ports 20 and 22 being disposed adjacent to one junction of said two lobes of the profile. If needed, a suitable spark plug (not shown) may be provided to ignite the intake charge. Ignition occurs near the region or area 24 of the peripheral wall inner surface 10 adjacent to the epitrochoidal minor axis. This ignition region 24 is situated between the inlet port means 20 and outlet port means 22, in the direction in which the rotor 16 turns, that is, on the side of the epitrochoidal major axis opposite said ports 20 and 22. The ignition region 24 is adjacent to the other junction of said two lobes of the profile.

In order to support the peripheral wall 6 and to resist the gas forces acting radially outward against the peripheral wall 6 in this region 24 in which the gas forces are greatest, the peripheral wall 6 is supported by providing each end wall 2 and 4 with a flange or step 26 disposed in this region 24 so that each step 26 overlies an end portion of the peripheral wall 6. The shear key or step 26 is integral with its end wall 2 or 4 and projects axially therefrom so as to overlie a shoulder 28 in a cut-back portion of the adjacent peripheral wall 6. In this way, the shoulders 28 and flanges 26 interlock the peripheral wall and end walls so that the peripheral wall is supported against radially outward pressures. Hence, fewer screws or bolts 30 are required, the housing parts are stronger and distortion and flexing of the peripheral wall is minimized.

The inner surface of each step 26 and the outer engageable surface of its cooperating shoulder 28 are made preferably flat. The matching facing surfaces of said step 26 and cooperating shoulder 28 are in a single plane. As shown in FIGURE 1, said flat engaging surfaces of each said step 26 and shoulder 28 in effect form a chord to the approximately circular outer surface of the peripheral wall 6 and are substantially perpendicular to a line joining said two junctions of the two lobes. The step 26 and shoulder 28 also form an offset in the adjoining bolting surfaces of the peripheral wall 6 and adjacent end wall 2 or 4 as sown in FIGURE 2. Thus, the straight-line design of the steps 26 on the inner surfaces 32 of the outer-body end walls 2 and 4, can readily be machined.

The flat inner surfaces 32 of the end walls 2 and 4 must not only be flush with the end bolting surface of the peripheral wall 6, but also must be an overall smooth surface for engagement with the rotor end-face seals (not shown), so that the end wall inner surfaces 32 must be carefully machined. The straight or flat construction of each flange or step 26 facilitates machining the flat inner end faces 32 of the end walls particularly as compared to an arcuate construction. Thus, by use of this straight-line design of the step 26, the inner face 32 of the end wall 2 and 4 can be machined without difficulty preferably by a grinding wheel that passes across it.

The straight step 26 and cooperating shoulder 28 is located in the region 24 adjacent to where the greatest gas forces occur, and is disposed generally perpendicular to the direction of the outward gas forces against the peripheral wall 6. Thus, distortion of the peripheral wall 6 is minimized, in an economical and simple fashion.

Screws 30 connect the end walls 2 and 4 with the peripheral wall 6. As stated above, the steps 26 cooperate with the shoulders 28 and resist the gas forces acting on the peripheral wall in the region 24 of the housing where ignition and expansion occur thereby minimizing the number of connecting screws 30 required adjacent to said region 24.

The step 26 on the inner surface 32 of the end wall 2 or 4 can also be used advantageously as a base or reference surface during the machining of the inner surface 10 of the peripheral wall 6 and for the boring of holes in the end walls 2 and 4, which receive the shaft bearings (not shown. In this way, manufacturing of the engine is facilitated, and finer dimensional tolerances are achieved.

The invention can also be used with the aforementioned advantages in rotary combustion engines wherein the peripheral-wall inner surface is in the form of three lobed or other mult-lobed design, and in addition in such engines where the outer body rotates.

While I have described my invention in detail in its present preferred embodiment it will be obvious to those skilled in the art after understanding my invention that various changes and modifications may be made therein without departing from the spirit and scope thereof. I intend by the appended claims to cover all such modifications.

What is claimed is:

1. A housing for a rotary mechanism having a region of relatively high heat input and intermittent high internal pressure, said housing comprising in combination a peripheral wall having an internal peripheral surface and having a longitudinal axis, a pair of end walls spaced apart by said peripheral wall along said axis and defining with said peripheral wall an internal cavity, said end walls having plane inner surfaces substantially parallel to each other, at least one of said end walls having a flange member extending therefrom in the axial direction from said plane surface and positioned outwardly of said internal peripheral surface, said flange member having an axially inward flat surface in a plane parallel with said axis, and said peripheral wall having a flat seat receiving said flange member in said region of high heat input and pressure.

2. A housing as defined in claim 1, wherein both of said end walls have said flange members extending toward each other, and said peripheral housing has a flat seat in said region of high heat input and pressure for receiving each of said flanges.

3. A housing as defined in claim 1, wherein said peripheral housing has a curved outer surface, and said axially inward flat surface of said flange member and said flat seat form a chord to an arc of said curved outer surface.

References Cited by the Examiner
UNITED STATES PATENTS

| | | | |
|---|---|---|---|
| 2,842,065 | 7/1958 | Lease | 103—126 |
| 2,866,417 | 12/1958 | Nubling | 123—8 |
| 2,988,065 | 6/1961 | Wankel et al. | 123—8 |

SAMUEL LEVINE, *Primary Examiner.*

JOSEPH H. BRANSON, Jr., *Examiner.*